(No Model.)
H. B. WILLIAMS.
VEHICLE HUB.
No. 433,112. Patented July 29, 1890.
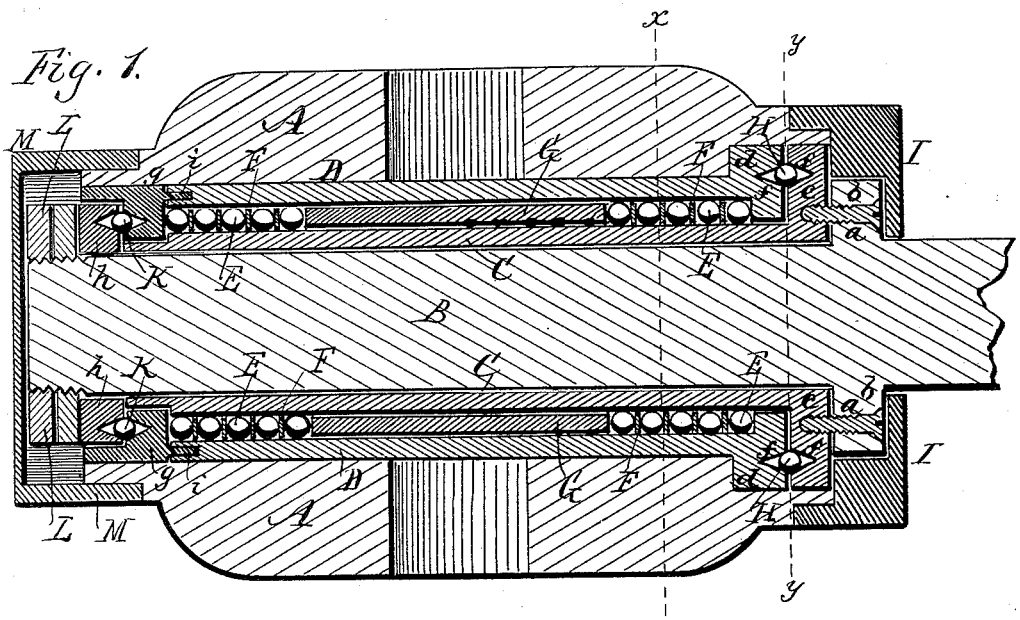
Fig. 1.
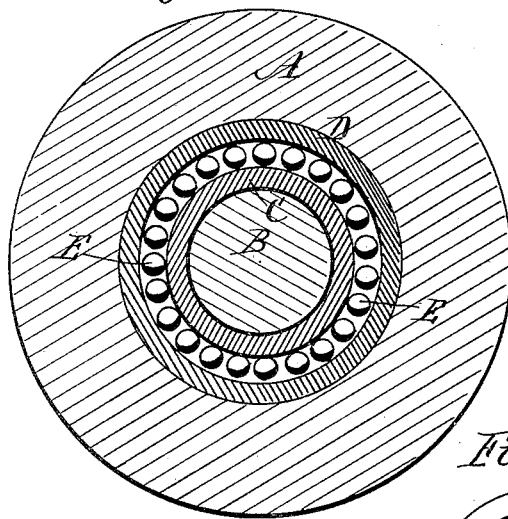
Fig. 2.
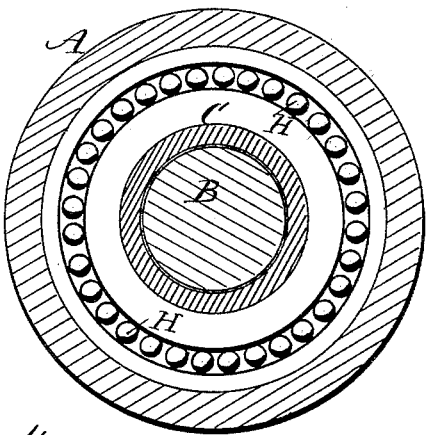
Fig. 3.
Fig. 4.
Witnesses.
Chas. J. Widener
J. Z. Culver
Inventor.
Henry B. Williams,
per R. F. Osgood,
atty.

UNITED STATES PATENT OFFICE.

HENRY B. WILLIAMS, OF ROCHESTER, NEW YORK, ASSIGNOR OF ONE-HALF TO LEMUEL A. JEFFREYS, OF SAME PLACE.

VEHICLE-HUB.

SPECIFICATION forming part of Letters Patent No. 433,112, dated July 29, 1890.

Application filed March 17, 1890. Serial No. 344,100. (No model.)

*To all whom it may concern:*

Be it known that I, HENRY B. WILLIAMS, of Rochester, in the county of Monroe and State of New York, have invented a certain new and useful Improvement in Vehicle-Hubs; and I do hereby declare that the following is a full, clear, and exact description of the same, reference being had to the drawings accompanying this application.

My improvement relates to anti-friction bearings for carriage-hubs, and is of that class where anti-friction balls are inserted in the space between the axle and hub-box, and are designed to keep the axle and box apart, and therefore reduce the friction and wear.

My invention consists in the construction and arrangement of parts hereinafter described and claimed.

In the drawings, Figure 1 is a longitudinal section of a carriage hub and axle, showing my improvement applied thereto. Fig. 2 is a cross-section of the same in line $x\ x$ of Fig. 1. Fig. 3 is a similar cross-section in line $y\ y$ of Fig. 1. Fig. 4 is a face view of one of the washers that are placed between the ball-bearings.

A indicates the hub, and B the axle, which in themselves are of usual form and construction.

C is a hardened-steel sleeve or tube, which is fitted closely around the axle. D is a similar hard tubular box attached to the interior of the hub. An annular space is left between these tubes of sufficient size to receive the ball-bearings. E E are the balls which rest in this space. They are made of hard steel and of perfect globular form. They are placed in the annular space between the tubes, closely fitting the same, and are separated by thin steel washers F F, which are placed around the sleeve C, thus dividing the balls into separate concentric layers, each of which acts independently of the others. These balls all take the bearing of the hub, and by rolling on the sleeve produce the minimum of friction. If desired, the balls may occupy the whole annular space between the box and axle; but this is usually unnecessary, and in order to fill the space, where the balls are used only near the ends, as shown in the drawings, an intermediate hard-steel tube G, forming a long washer, is placed around the sleeve C, separating the two sets of balls. In fact, the use of this long washer is an advantage, as it gives a more substantial central support, while the sets of balls at opposite ends take all the bearing. The washer G is made so thin that it takes none of the bearings, but serves as a separator.

By the use of the sleeve placed around the axle the axle can be made of the usual soft and tough metal, while an exterior surface is used to receive the wear made of hardened steel. This sleeve is placed loosely around the axle, and therefore can be removed or replaced at any time. The wheel will run a long time without cutting channels in the sleeve, and when the sleeve does become worn it can be readily replaced. The sleeve is attached to the axle by any suitable means, that shown in the drawings being screws $a\ a$ that pass through the shoulder $b$ of the axle and screw into a flange $c$ of the sleeve. The box is attached to the hub by keying in the ordinary way.

H H are a set of similar balls placed concentrically between the flanges $c$ and $d$ of the sleeve and box at the inner or base end of the hub and serving to take the end-thrust that is produced on the hub when in use. Preferably they run in V-shaped grooves $f\ f$, made in each flange. These balls not only take the end-thrust, but they keep the hub squarely in position, as there is less liability of wearing out of true than where the broad friction-surfaces come together, as in ordinary hubs, and friction also is greatly reduced. The hub is held to the axle at the inner end by a cap I, that embraces the axle outside the shoulder $b$ and reaches over and is pinned or otherwise attached to the hub.

K K are a corresponding set of balls arranged in the same way in the outer end of the hub, resting concentrically between two rings $g$ and $h$, which are provided with V-shaped grooves to receive them. The ring $g$ is attached to the end of the box D by dowels $i\ i$ or other means, so that this ring revolves with the box. The ring $h$ is inserted loosely, and serves as a follower to be pressed up to keep the joint tight. It is pressed up to place by one or more nuts L, screwed onto the end of the axle. When so pressed up, it becomes practically a fixture with the axle, and the balls turn thereon. The outer end of the hub is preferably inclosed by a cap M. By the use of these concentric balls at the outer end of the hub not only is the friction reduced, but by turning up the follower-ring at the outer end the hub can be tightened in place at any time, thus obviating looseness and compensating for wear. The two sets of balls at opposite ends oppose each other and take the friction at both ends of the hub.

Having described my invention, what I claim as new, and desire to secure by Letters Patent, is—

1. The combination, with the axle and hub, of a hardened sleeve applied outside the axle, a hardened box applied inside the hub, a set of anti-friction balls resting between the sleeve and box, and washers separating the balls into concentric sets, as specified.

2. The combination, with the axle and hub, of a sleeve applied outside the axle, a box applied inside the hub, sets of anti-friction balls resting between the sleeve and box at opposite ends thereof, and an intermediate washer filling the space between the two sets of balls, as herein shown and described.

In witness whereof I have hereunto signed my name in the presence of two subscribing witnesses.

H. B. WILLIAMS.

Witnesses:
L. A. JEFFREYS,
R. F. OSGOOD.